United States Patent [19]
Bainbridge et al.

[11] 3,851,473
[45] Dec. 3, 1974

[54] BRAKE APPLICATION CONTROL DEVICES

[75] Inventors: Wilfred Nicholas Bainbridge; David Parsons; Harold Hodkinson, all of Leamington Spa, England

[73] Assignee: Automotive Products Company Limited, Leamington Spa, England

[22] Filed: June 7, 1973

[21] Appl. No.: 367,781

[30] Foreign Application Priority Data
June 9, 1972    Great Britain .................... 27036/72

[52] U.S. Cl. .................................. 60/552, 91/372
[51] Int. Cl. .............................................. F15b 7/00
[58] Field of Search ............ 60/547, 552, 553, 548; 91/434, 372, 371

[56] References Cited
UNITED STATES PATENTS

| | | | |
|---|---|---|---|
| 2,318,756 | 5/1943 | Chouings | 91/372 |
| 2,410,269 | 10/1946 | Chouings | 60/553 |
| 2,766,732 | 10/1956 | Schultz | 91/372 |
| 2,775,957 | 1/1957 | Anderson | 91/372 |
| 3,106,874 | 10/1963 | Schultz | 91/434 |
| 3,173,339 | 3/1965 | Larsen | 91/434 |

*Primary Examiner*—Edgar W. Geoghegan
*Assistant Examiner*—A. M. Zupcic

[57]    ABSTRACT

A dual line liquid pressure braking system includes a master cylinder device in which the driver operable pedal acts upon the master cylinder piston through the spool of a spool valve which controls the connection of a group of brake operating master cylinders to either a liquid pressure accumulator or to a reservoir. Liquid displaced from the master cylinder bore by movement of the master cylinder piston is fed to another group of brake operating motor cylinders.

8 Claims, 6 Drawing Figures

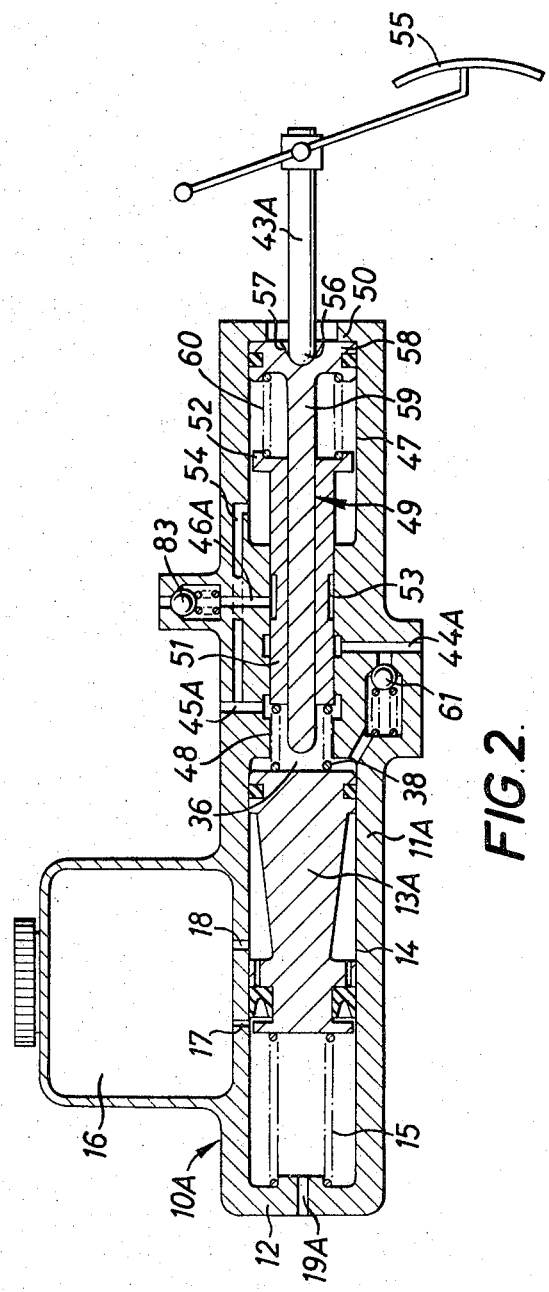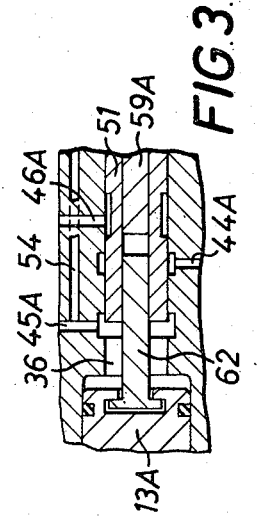

BRAKE APPLICATION CONTROL DEVICES

This invention is concerned with fluid pressure control systems including a master cylinder device, a slave cylinder device and conduit means connecting the master cylinder device to the slave cylinder device so that liquid displaced from the master cylinder by movement therein of a master cylinder piston is transmitted to the slave cylinder causing movement of a slave cylinder piston in the slave cylinder. More particularly, although not exclusively, the invention is concerned with fluid pressure braking systems for vehicles. The fluid pressure braking systems may be of the kind which consists of two separate sub-systems and a common brake application control device, each sub-system including a separate brake operating motor cylinder or group of brake operating motor cylinders and being independent of the other in the sense that failure of the pressure source of either sub-system, or leakage of fluid from either sub-system, does not effect the availability of fluid pressure in the other of said sub-systems. Each sub-system may, for example, actuate brakes on some of the wheels of the vehicle, or brakes on some or all of the wheels of the vehicle may each be operable by more than one motor cylinder, each of the motor cylinders operating a particular brake being connected in a different sub-system. Where two motor cylinders are provided to operate a single brake, they may form a single unit having two pistons each operated by fluid pressure in one of the sub-systems. The common brake application control device comprises one part which is a liquid pressure master cylinder for one of the two sub-systems, and another part which comprises control valve means for the other subsystem, the two parts being inter-related so that, in addition to being operable to feed fluid pressure from a supply source to the associated motor cylinder or cylinders when the brakes are to be applied, the fluid pressure supply source being maintained continuously available when the vehicle is in operation, the control valve means are arranged to apply fluid pressure from said fluid pressure supply source to the piston of the master cylinder to move said piston and produce liquid pressure in said one sub-system. The usual driver operable linkage is arranged to actuate the control valve means normally and also, in the event of failure of said other fluid pressure braking system, to actuate the piston of the master cylinder.

This invention relates to a master cylinder device which is suitable for use as a brake application control device of the kind referred to.

In a brake application control device of the kind referred to, the control valve means any comprise tilt valves operable by axial movement of a plunger so as to connect the respective motor cylinder or cylinders selectively to the fluid pressure supply source or the reservoir. However a certain amount of pedal effort is required to actuate such tilt valves.

It is an object of this invention to provide a master cylinder device which is suitable for use as a brake application control device of the kind referred to and which includes control valve means which can be actuated by the driver operable linkage to connect the respective motor cylinder or cylinders selectively, to the fluid pressure supply source or to the reservoir without absorbing a significant amount of the pedal effort.

According to this invention there is provided a master cylinder device comprising a body, a bore in the body, a freely floating master cylinder piston in the bore, and control means arranged to apply fluid under pressure from a remote fluid pressure supply source to the master cylinder piston to move the master cylinder piston within the bore, wherein the control valve means include a valve spool slidable in the bore, the valve spool being arranged to place a first port in the wall of the bore in communication with a second port in the wall of the bore, or with a third port in the wall of the bore and with a space in the bore between the valve spool and the piston, dependent upon the position of the valve spool within the bore.

Preferably the valve spool is arranged so as to place said first port in communication with said third port via said space. Conveniently said first port communicates with said space via a nonreturn valve which prevents flow of fluid from said space towards said first port. Optionally said first port and said space are placed in communication with the selected one of said second and third ports via passage means in said valve spool.

Said valve spool may be arranged to abut the freely floating piston so as to impart brake applying movement to said master cylinder piston if fluid pressure is not available in said space to move said piston. Alternatively the valve spool may have a through bore, there being a rod in the through bore, first resilient means urging the tubular valve spool away from the piston and second resilient means arranged so that brake applying movement imparted to the rod is imparted to said valve spool via said second resilient means and, if fluid pressure is not available in said space to move said piston, said rod abuts the piston, or a component carried by the piston, so as to impart brake applying movement to the piston. The second resilient means may act between the valve spool and the rod so as to urge the rod away from the piston. The piston may include or carry a rod portion which projects into said through bore so as to be abutted by said rod if fluid pressure is not available in said space to move said piston. The second resilient means may comprise a pad of elasto-meric material.

The first port may be formed in the wall of an annular cylinder space which surrounds the smaller diameter portion of the stepped master cylinder and extends between the larger diameter portion of the master cylinder piston and a shoulder between the respective bore portion in which the two piston portions slide, and a passage for connecting the annular cylinder space to said space between the valve spool and the master cylinder piston may be provided. The passage may extend through the larger diameter master cylinder piston portion, and may be closed by engagement of the valve spool with the master cylinder piston.

According to another aspect of this invention a fluid pressure control system includes a master cylinder device, a slave cylinder device and conduit means connecting the master cylinder device to the slave cylinder device so that liquid displaced from the master cylinder by movement therein of a master cylinder piston is transmitted to the slave cylinder causing movement of a slave cylinder piston in the slave cylinder, wherein the master cylinder device is a master cylinder device according to the preceding aspect of this invention, said second port being connected to a liquid reservoir and said third port being connected to a source of liquid pressure.

Preferably the fluid pressure control system is a fluid pressure control system for a vehicle, wherein the slave cylinder is one brake operating motor cylinder and said first port is in conduit communication with another brake operating motor cylinder. Optionally the fluid pressure control system for a vehicle includes a non-return valve between said third port and said source of liquid pressure, the non-return valve preventing backflow of liquid from said third port to said source of liquid pressure. The source of liquid pressure may be a liquid pressure accumulator or a liquid filled strut of a liquid filled suspension system. In the latter arrangement the first port may be connected to motor cylinders which are operable to apply brakes to wheels which are supported by an axle with which the liquid filled suspension strut co-operates to support the body of the vehicle, the arrangement being such that the pressure of liquid fed through the first port to the motor cylinders is limited to the pressure of liquid in the suspension system.

The fluid pressure control system may be a friction clutch operating control system, in which case the first port of the master cylinder device is closed.

Several embodiments of this invention will be described now by way of example only with reference to the accompanying drawings, of which:

FIG. 2 is a transverse section through another form of brake application control device according to this invention;

FIG. 3 illustrates a modification of the brake application control device of FIG. 2.

Figure 1:
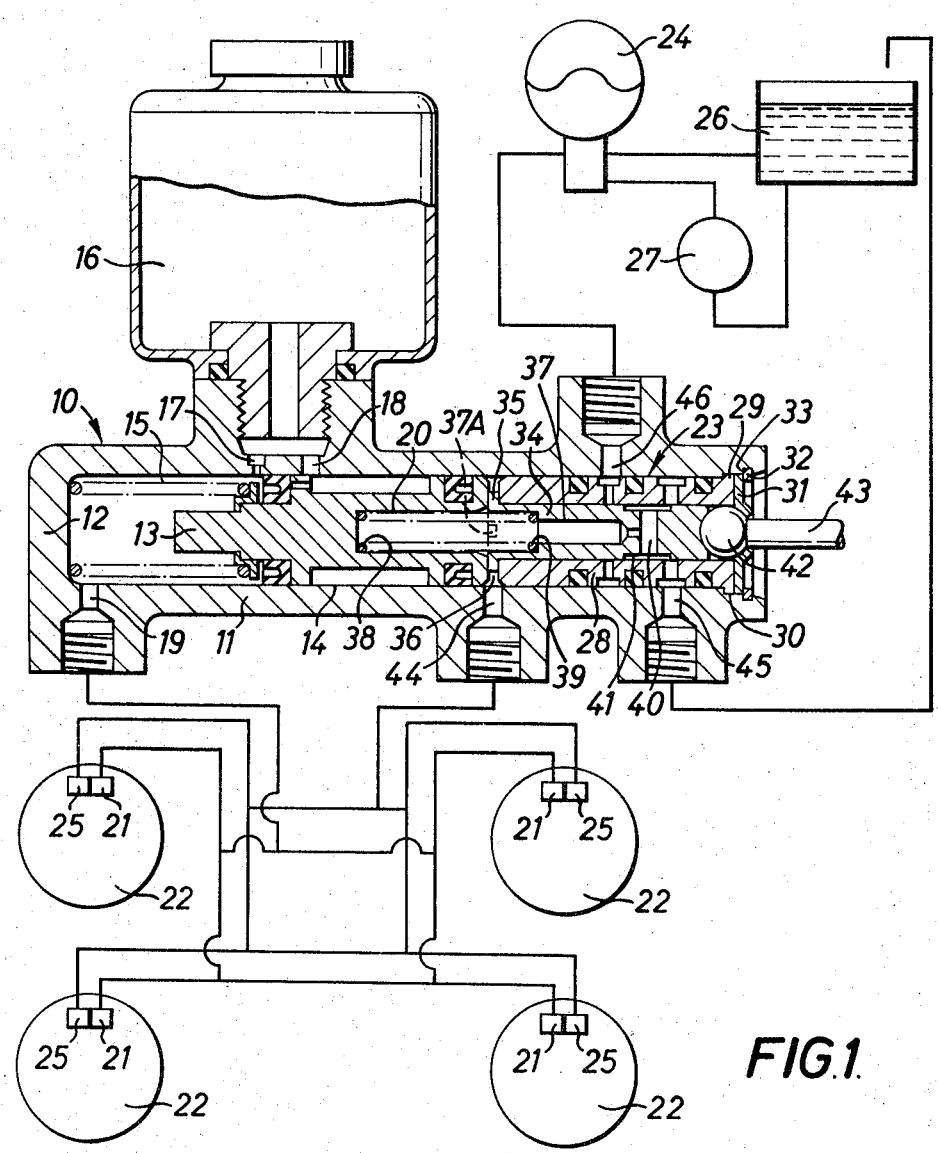
FIG. 1 is a transverse section through one form of brake application control device according to this invention.

Referring to FIG. 1 of the accompanying drawings, a brake application control device 10 comprises a tubular body 11 which is closed at one end 12. A freely floating master cylinder piston 13 slides in a bore 14 of the tubular body 11 and is urged away from the closed end wall 12 by a coil spring 15. A reservoir 16 for hydraulic fluid is mounted on the tubular body 11 and is placed in communication with the portion of the bore 14 within which the freely floating piston 13 slides, via the usual ports 17 and 18 in the wall of the tubular body 11. A master cylinder port 19 opens into the portion of the bore 14 between the freely floating piston 13 and the closed end wall 12. A closed ended axial recess 20 is formed in the end of the master cylinder piston 13 remote from the closed end wall 12.

The master cylinder port 19 is connected to motor cylinders 21 which operate brakes on the wheels 22 of a vehicle.

The brake application control device 10 has a spool valve 23 housed witin the bore 14 between the master cylinder piston 13 and the open end of the bore 14. The spool valve 23 controls the supply of liquid under pressure from a liquid pressure accumulator 24 to another group of motor cylinders 25 operating brakes on the wheels 22 of the vehicle, the liquid pressure accumulator 24 being part of a separate braking system of the continuous flow and stored energy type in which liquid, drawn from a reservoir 26 by a pump 27 arranged to be driven continuously by the engine of the vehicle, is supplied under pressure to the liquid pressure accumulator 24.

The spool valve 23 comprises a tubular spool valve housing 28. The housing 28 has a radial flange 29 at its end remote from the piston 13. The radial flange 29 is held in engagement with a shoulder formed between an enlarged end portion 30 of the bore 14 and the remainder of the bore 14, by an annular washer 31 which is clamped between the tubular housing 28 and a circlip 32 engaged in an annular groove 33 in the enlarged end bore portion 30.

A spool 34, slidable in the bore of the tubular spool valve housing 28, has a radial flange 35 at its end nearer the piston 13, the radial flange 35 ensuring that the master cylinder piston 13 is not urged into abutment with the tubular spool valve housing 28, by the action of the spring 15, so that a space 36 is defined within the bore 14 between the tubular spool valve housing 28 and the piston 13.

A stepped axial bore 37 has its largest diameter portion opening at the end of the spool 34 nearer to the piston 13. A radial groove 37A in the end face of the radial flange 35 ensures communication between the stepped axial bore 37 and the space 36 even when the spool 34 abuts the piston 13 as shown in FIG. 1. A coil spring 38 takes its reaction from the closed end wall of the closed ended axial recess 20 in the piston 13 and engages a shoulder 39 defined between the largest diameter portion and an intermediate diameter bore portion of the stepped axial bore 37. The load exerted by the coil spring 38 is less than the load exerted by the coil spring 15. The smallest diameter portion of the stepped axial bore 37 opens into a diametral bore 40, the ends of the diametral bore 40 opening into the annular recess 41 formed in the periphery of the spool 34.

The end of the spool 34 remote from the piston 13 is engaged by the spherical end 42 of a push rod 43, the spherical end 42 being retained within the bore of the tubular spool valve housing 34 by the radially inner peripheral portion of the annular washer 31.

The spool valve 23 controls the connection of a first port 44 in the tubular body 11 with either a second port 45 or a third port 46 in the tubular body 11. The first port 44 opens into the space 36 and the second and third ports 45 and 46 open into the bore of the tubular spool valve housing 34, the third port 46 being nearer the space 36 than is the second port 45 and being spaced from the second port 45 by a distance which is slightly greater than the axial extent of the annular recess 41.

The first port 44 is connected to the motor cylinders 25, the second port 45 is connected to the reservoir 26 of the continuous flow and stored energy type of liquid pressure braking system, and the third port 46 is connected to the liquid pressure accumulator 24.

The push rod 43 is arranged to be connected to a driver operable pedal by a suitable linkage.

In operation of the brake application control device 10, an effort applied to the push rod 43 in order to apply the brakes to the wheels of the vehicle urges the push rod 43 towards the closed end 12 of the tubular body 11. Initially the spool 34 and the master cylinder piston 13 move together towards the closed end wall 12 so that communication between the reservoir 16 and the cylinder space between the master cylinder piston 13 and the closed end wall 12 is cut off and the pressure of liquid within the cylinder space between the master cylinder piston 13 and the closed end wall 12 is increased. The piston 13 and the spool 34 move together until the third port 46 is placed in communication with the space 36 via the annular recess 41, the diametral bore 40, the stepped axial bore 37 and the radial groove 37A. It will be appreciated that the connection between the port 44 and the reservoir 26 is interrupted by such movement of the spool 34. The consequent supply of liquid under pressure from the liquid pressure accumulator 24 through the port 46 to the space 36 results in the master cylinder piston 13 being moved away from the spool 34 towards the closed end wall 12 so that liquid is displaced from the cylinder space between the master cylinder piston and the closed end wall 12 to the associated group of motor cylinders 21. Liquid under pressure within the space 36 also is conveyed through the first port 44 to the associated group of motor cylinders 25.

In the event of failure occurring in the liquid pressure braking system of the continuous flow and stored energy type which results in insufficient liquid pressure being available within the space 36 to move the piston 13 away from the spool 34, the piston 13 can be moved by the action of the push rod 43 acting directly through the spool 34 which remains in abutment with the piston 13.

When the driver operable pedal is released, the springs 15 and 38 return the master cylinder piston 13 and the spool 34 to the position illustrated in FIG. 1 of the drawings.

FIG. 2 of the accompanying drawings illustrates a similar brake application control device including another form of spool valve for controlling the hydraulic actuation of the master cylinder portion and the supply of liquid under pressure from the accumulator 24 to the associated group of motor cylinders 25. Basically the construction and operation of the master cylinder part of the brake application control device is the same as in the brake application control device 10 described above with reference to FIG. 1 of the accompanying drawings. Accordingly the master cylinder part will not be described in detail and the relevant reference numerals employed in the description of FIG. 1 of the drawings are employed also in FIG. 2. One modification which should be noted is that the master cylinder port 19A is formed in the closed end wall 12.

The bore of the tubular body 11A is stepped comprising the master cylinder bore 14 and an end bore portion 47 which are separated by a smaller diameter intermediate bore portion 48. The part of the tubular body 11A within which the smaller diameter intermediate bore portion 48 is formed functions as the housing of the spool valve portion 49. The tubular body 11A has a radially inwardly extending annular flange 50 at its open end.

A tubular spool 51 is slidable in the smaller diameter bore portion 48, extends into the end bore portion 47 and has a radially outwardly extending flange 52 at its end remote from the master cylinder piston 13. An annular groove 53, formed in the portion of the spool 51 located within the smaller diameter bore portion 48, communicates with the third port 46A. The second port 45A is nearer the master cylinder piston 13 than is the first port 44A and also is in communication with the larger diameter bore portion 47 via a branch passage 54.

The push rod 43A which is coupled with a driver operable pedal 55 has a spherical end 56 which engages in a concave spherical recess 57 in a plunger 58 which is slidable in the end bore portion 47. The plunger 58 has an integral axially extending rod 59 which extends through the bore of the tubular spool 51. Normally the plunger 58 is held against the radial flange 50 by a coil spring 60 which takes its abutment from the radial flange 52 of the tubular spool 51. The coil spring 38 acts to hold the master cylinder 13A spaced from the shoulder between the master cylinder bore 14 and the smaller diameter bore portion 48 and to locate the spool 51 so that the annular recess 53 communicates only with the third port 46A, the second port 45A being in communication with the space 36 between the master cylinder piston 13A and the tubular spool 51. The end of the rod 59 remote from the plunger 58 is spaced from the master cylinder piston 13A. The first port 44A is connected to the space 36 via a nonreturn valve 61 which prevents flow of liquid from the space 36 to the first port 44A.

The spring 60 between the tubular spool 51 and the plunger 58 functions as a feel device and may be replaced by a pad of elastomeric material which is shaped suitably to give a non-linear effect.

In operation of the brake application control device illustrated in FIG. 2, actuation of the pedal 55 to apply the brakes moves the plunger 58 towards the closed end wall 12, such movement of the plunger 58 is imparted to the tubular spool 51 through the coil spring 60. Such movement of the tubular spool 51 is transmitted to the master cylinder piston 13A through the coil spring 38 so that communication between the reservoir 16 and the cylinder space between the master cylinder piston 13A and the closed end wall 12 is cut off by the master cylinder piston 13A. Movement of the spool 51 towards the closed end wall 12 closes the connection between the second port 45A and the space 36 and subsequently places the third port 46A in communication with the first port 44A, via the annular recess 53, so that liquid under pressure is supplied from the accumulator 24 to the associated brake motor cylinders 25 through the first port 44A. The nonreturn valve 61 permits such liquid under pressure to flow from the first port 44A to the space 36 so that the master cylinder piston 13A is moved towards the closed end wall 12 and liquid is displaced from the cylinder space between the master cylinder piston 13A and the closed end wall 12 through the master cylinder port 19A to the associated group of motor cylinders 21. The pressure of liquid in the space 36 acts upon the tubular spool 51 and the plunger 58 to provide a resistance to further brake applying movement of the pedal 55 and thus provides a feel indication of the degree of application of the brakes. If the fluid pressure loading on the spool 51 due to the pressure of liquid in the space 36 is exceeded by the load transmitted via the spring 60 to the spool 51 due to effort applied to the pedal 55 by the driver, the spool 51 and the plunger rod 59 together act as a piston so that the excess loading is transmitted to the master cylinder piston 13A through the liquid in the space 36.

When the pedal 55 is released to release the brakes, the springs 15 and 38 urge the master cylinder piston 13A and the tubular spool 51 away from the closed end wall 12 so as to uncover the second port 45A and allow liquid in the motor cylinders 25 connected to the first port 44A to be returned to the reservoir 26 through the non-return valve 61, the space 36 and the second port 45A.

If a failure should occur in the continuous flow stored energy type liquid pressure system whilst the brakes are applied, the brakes actuated by the master cylinder part of the brake application control device will be held engaged by the action of liquid in the space 36 which is locked therein because of the non-return valve 61 and the fact that the second port 45A is closed by the tubular spool 51. Subsequently, operation of the pedal 55 to apply the brakes will remove the rod 59 of the plunger 58 into abutment with the master cylinder piston 13A so that the master cylinder part of the brake application control device is operated in a similar manner to conventional master cylinders. Provision of the axially extending rod 59 of the plunger 58, which rod 59 extends through the bore of the tubular spool 51, enables actuating movement of the pedal 55, following failure of the continuous flow stored energy type liquid pressure system, without corresponding movement of the master cylinder piston 13A to be minimised. The plunger rod 59 would be arranged to be in contact with the master cylinder piston 13A when the brake application control device is in its inoperative mode.

A modification of the brake application control device described above with reference to FIG. 2 is illustrated in FIG. 3. In this modification, the rod 59A of the plunger 58 is shorter so that it terminates within the bore of the tubular spool 51. The master cylinder piston 13A carries a plunger 62, which projects into the bore of the tubular spool 51. Normally the plunger 62 may be spaced from the rod 59A, as shown. It will be appreciated that the reaction of further movement of the pedal 55 in the brake applying direction due to liquid pressure within the space 36 is less than in the brake application control device of FIG. 2 because it is derived only from the action of liquid pressure on the annular area of the tubular spool 51, and not, as in the brake application control drive of FIG. 2, due to the action of liquid under pressure in the space 36 upon both the tubular spool 51 and the stem 59A.

It will be appreciated that in the event of a failure occurring in the master cylinder part of any one of the brake application control devices described above, or in the respective pipe connections to the associated motor cylinders, or in the associated motor cylinders, the liquid pressure braking system of the continuous flow stored energy type can be operated normally under the control of the control valve portion of the brake application control device, the master cylinder piston 13 or 13A being held in abutment with the end wall 12 by the action of liquid under pressure in the space 36.

Figure 4:
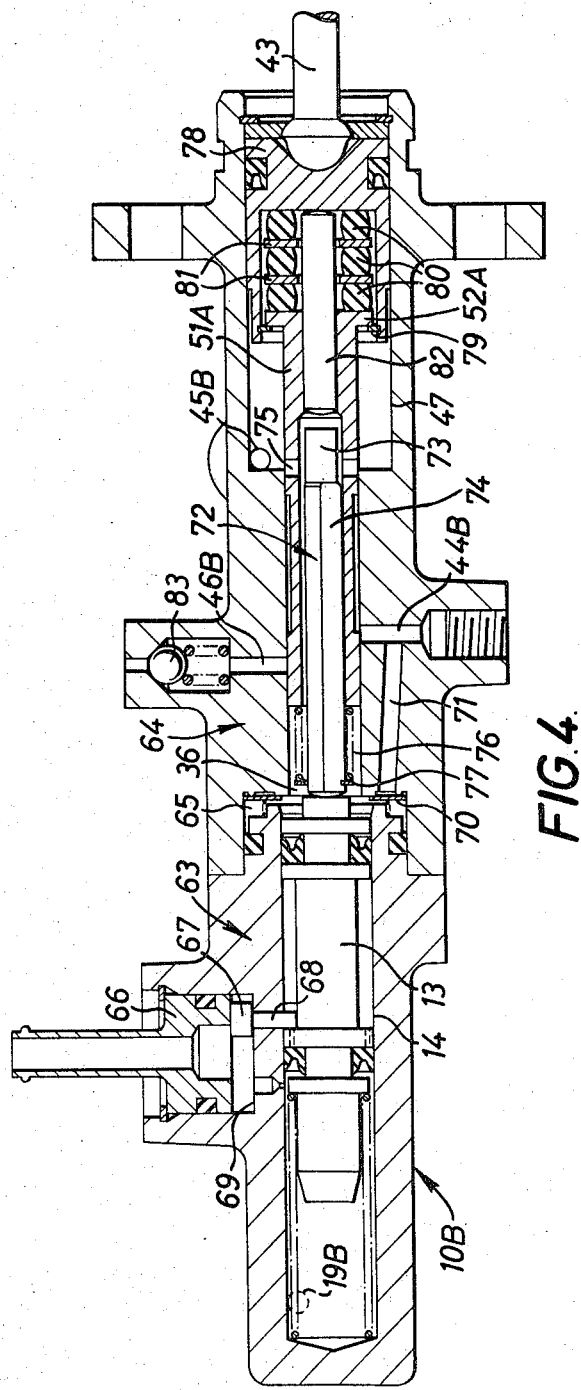
FIGS. 4, 5 and 6 are transverse sections through other forms of brake application control device according to this invention.

FIG. 4 of the accompanying drawings illustrates another brake application control device which is similar to that described above with reference to FIG. 2 of the accompanying drawings. Relevant reference numerals employed in the description of FIGS. 1 and 2 of the drawings are employed also in FIG. 4.

The tubular body comprises the master cylinder part 63 and the control valve part 64 which are secured together by set screws (not shown). The master cylinder part 63 is spigotted into the control valve part 64 so that a radially inwardly opening annular recess 65 is defined therebetween. The master cylinder part 63 carries a connector 66 for connection to a remote liquid reservoir (not shown), instead of the integral liquid reservoir which is a feature of the embodiments described above. The head 67 of a pin 68 is trapped between the connector 66 and the base 69 of a cup-shaped recess within which the connector 66 is retained. The pin 68 extends through an aperture in the wall of the master cylinder part 63 and projects into the master cylinder bore 14 to serve as a stop for the master cylinder piston 13.

The second port 45B communicates with the end bore portion 47. The first port 44B communicates with the annular recess 65 and an annular plate valve 70 in the annular recess 65 is spring loaded to close the mouth of the connecting passage 71 and serve as a non-return valve.

A rod 72 has an end portion 73 within the bore of the tubular spool 51A, the diameter of the end portion 73 being less than that of the adjacent wall of the bore of the tubular spool 51A, and a grooved portion 74 which is slidable within the bore of the tubular spool 51A and projects into the space 36. The grooves of the grooved portion 74 extend axially and place the space 36 in communication with the annular space within the bore of the tubular spool 51A which surrounds the end portion 73. A radial bore 75 in the tubular spool 51A communicates with the annular space within the bore of the tubular spool 51A which surrounds the end portion 73. A light coil spring 76 takes its reaction from the end of the tubular spool 51A nearer to the master cylinder piston 13 and acts through a circlip 77 carried by the rod 72 within the space 36 to urge the rod 72 towards the master cylinder piston 13.

The push rod 43 is connected to a cup-shaped plunger 78 which slides within the larger diameter end bore portion 47. The radially outwardly extending flange 52A of the tubular spool 51A is retained within the cavity of the cup-shaped plunger 78 by a circlip 79 and is urged into abutment with the circlip 79 by resilient means which take reaction from the base of the cavity. The resilient means comprise three axial rings 80 of elastomeric material, each juxtaposed pair of rings 80 being separated by an annular washer 81. A pin 82 slides within the end portion of the bore of the tubular spool 51A remote from the master cylinder piston 13 and projects into the cavity of the cup-shaped plunger 78. The length of the pin 82 is less than the distance between the base of the cup-shaped plunger 78 and the nearer end of the rod 72 when the flange 52A abuts the circlip 79, and when the rod 72 is held in contact with the master cylinder plunger 13 by the light coil spring 76.

The operation of the brake application control device illustrated in FIG. 4 is basically the same as the operation of the brake application control device illustrated in FIG. 2. It will be appreciated that the second port 45B communicates with the space 36 through the radial bore 75 and the axially extending grooves of the rod 72 when the radial bore 75 opens into the larger diameter end bore portion 47. Furthermore movement of the push rod 43 when there has been a failure in the continuous flow stored energy type liquid pressure system, is transmitted to the master cylinder piston 13 via the cup-shaped plunger 78, the pin 82 and the rod 72, the pin 82 being moved into contact with the rod 72.

Figure 5:
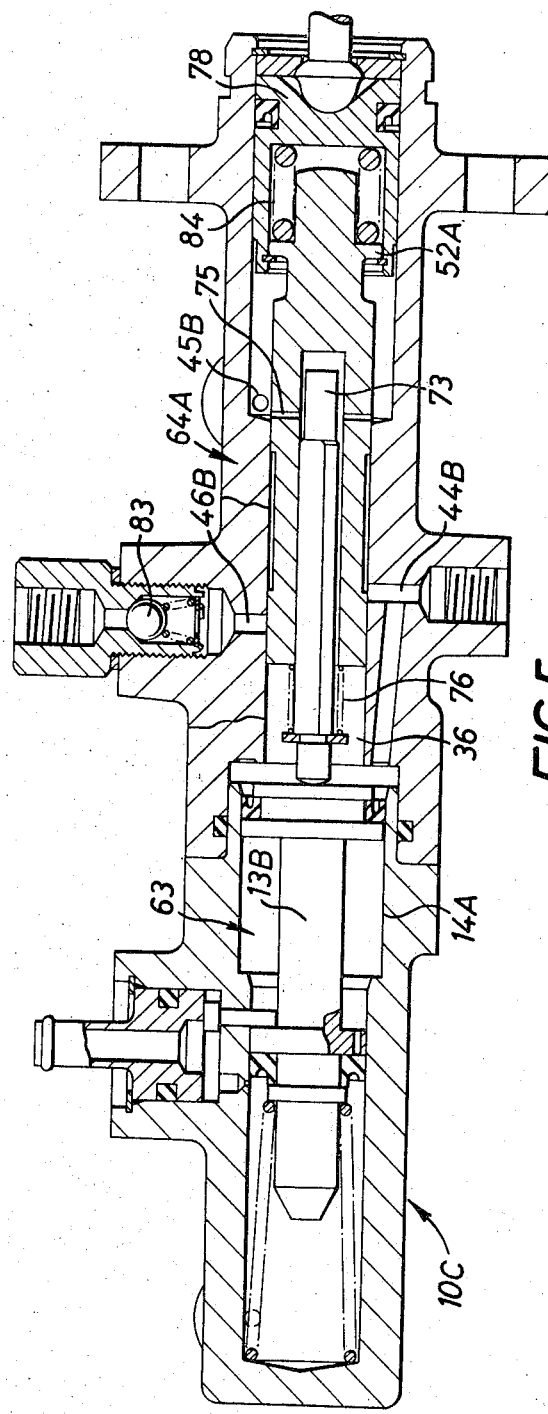

The first port 46A, 46B of the brake application control devices 10A, 10B, 10C described above with reference to FIGS. 2, 3 or 4 may be connected to the accumulator 24 via a non-return valve 83 (see FIG. 2) in which case the non-return valve 61, 70 incorporated in the device 10 may be eliminated. The brake application control device 10C shown in FIG. 5 is similar to the master cylinder device 10B shown in FIG. 4, and includes a non-return valve 83 which enables the plate valves 70 to be eliminated. The brake application control device 10C shown in FIG. 5 is similar to that described above with reference to FIG. 4 and will not be described herein in detail. However two features of the device 10C should be noted. First the master cylinder portion 63A has a stepped bore 14A, the larger diameter bore portion being nearer the control valve portion 64A than is the smaller diameter bore portion. Thus the master cylinder piston 13B is stepped also, its larger diameter piston portion, which slides in the larger diameter portion of the stepped bore 14A, affording a wall of the space 36. Secondly the form of the tubular spool 51B is different from that shown in FIG. 4, the end of the spool 51 B nearer the plunger 78 being closed and the pin 82 being omitted. The resilient means which urge the flange 52A into abutment with the circlip 79 comprise a coil spring 84.

Figure 6:
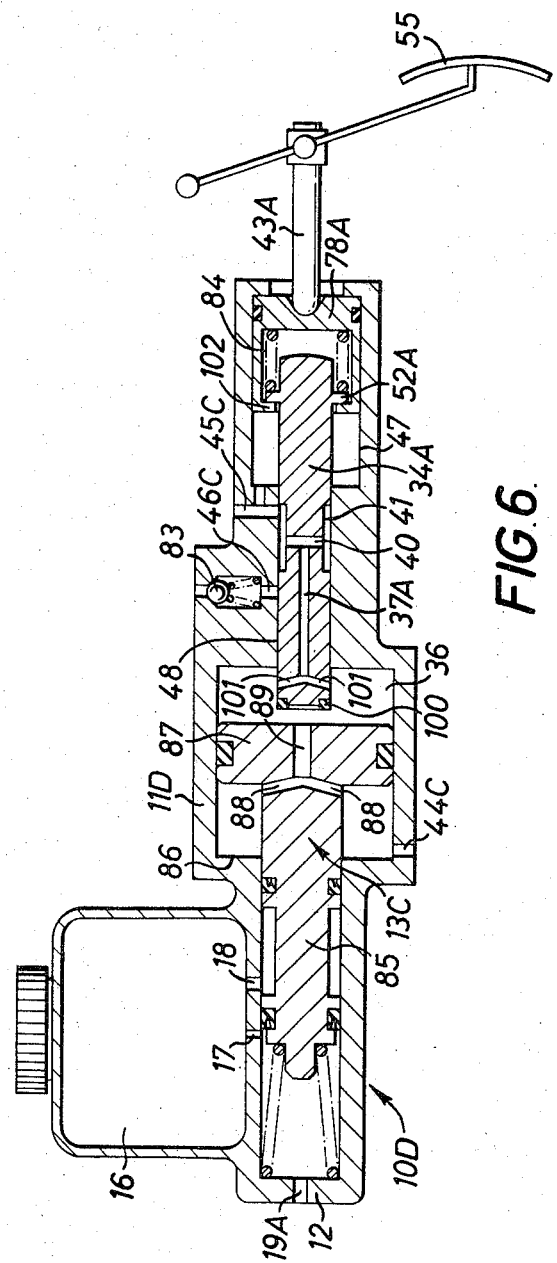

Referring now to FIG. 6, there is shown another form 10D of brake application control device which includes a stepped master cylinder piston 13C and has a non-return valve 83 between the third port 46C and the accumulator 24. Various parts of the brake application control device 10D correspond to like parts of the brake application control devices shown in FIGS. 1 to 5 and have been given the same references.

The first port 44C communicates with the annular cylinder space which surrounds the smaller diameter piston portion 85 of the stepped master cylinder 13C and extends between the shoulder 86 between the two bore portions of the stepped master cylinder bore and the larger diameter portion 87 of the stepped master cylinder 13C. The said annular cylinder space communicates with the space 36 through transverse passages 88 in the smaller diameter piston portion 85 and an axial passage 89 through the larger diameter piston portion 87.

The spool 34A slides in the smallest diameter bore portion 48 of the tubular housing 11D and projects from both ends thereof. The end of the spool 34A which projects into the space 36 carries an annular sealing ring 100 which engages the surface of the larger diameter piston portion 87 surrounding the mouth of the axial passage 89 in order to close communication between the axial passage 89 and the space 36.

An axial passage 37A in the spool 34A communicates at one end with the space 36 via transverse passages 101 and at the other end with an annular recess 41 in the cylindrical surface of the spool 34A via a diametral passage 40. The end of the spool 34A remote from the stepped piston 13C projects into the cavity of a cup-shaped plunger 78A and has a flange 52A which is urged by a coil spring 84 into abutment with an inwardly directed annular flange 102 formed at the rim of the cup-shaped plunger 78A.

In operation of the brake application control device 10D illustrated in FIG. 6, actuation of the pedal 55 to apply the brakes moves the plunger 78A towards the closed end wall 12. Such movement of the plunger 78A is imparted to the spool 34A through the coil spring 84 so that communication between the space 36 and the reservoir 26 through the transverse passages 101, axial passage 37A, diametral passage 40, annular recess 41, and second port 45C is cut off and communication between the space 36 and the accumulator 24 via the passages 101, 37A and 40, the annular recess 41 and the third recess 46C is established. Liquid pressure supplied to the space 36 ensures that the master cylinder 13C is separated from the annular seal 100 to open the passages 88 and 89 and allow liquid pressure to be supplied to the motor cylinders 25 via the passages 88 and 89 and the first port 44C. It will be appreciated also that there is a differential pressure loading acting to urge the stepped master cylinder piston 13C towards the closed end wall 12.

If a failure should occur in the continuous flow stored energy type liquid pressure system upstream of the brake application control device 10D, whilst the brakes are applied, the brakes will be held applied by the action of the non-return valve 83. Subsequently, operation of the pedal 55 to apply the brakes will move the spool 34A into abutment with the master cylinder piston 13C so that the stepped master cylinder 13C displaces liquid through both ports 19A and 44C to the motor cylinders 21 and 25. Provision of the annular sealing ring 100 ensures that liquid does not flow from the annular cylinder space to the space 36 via the passages 88 and 89 instead of being displaced through the first port 44C to the motor cylinders.

The source of fluid pressure associated with the control valve part of one of the brake application control devices described above may be a liquid filled strut of a liquid pressure suspension system, instead of a liquid pressure accumulator 24. Such a suspension system is described in the Provisional Specification filed in connection with our co-pending Application No. 7921/72. The port 44A, 44B of the brake application control devices 10A, 10B described above with reference to FIGS. 2, 3 or 4 would be connected to motor cylinders operating brakes on wheels supported by the axle (e.g. the rear axle) with which the liquid filled strut is associated.

Thus the maximum pressure fed to those motor cylinders to apply the brakes is limited to the suspension pressure which minimises the incidence of wheel locking. The pressure of liquid fed to the motor cylinders operating brakes on other wheels of the vehicle (e.g. the front wheels) can be higher than the suspension pressure because of effort imparted via the pushrod 43, 43A and the spool 51, 51A etc., to liquid trapped between the spool 51, 51A and the master cylinder piston 13, 13A. On the other hand, if the non-return valve within the brake application control device 10A is eliminated and the port 46A is connected to the suspension strut, or other source of fluid pressure, through an external non-return valve 83, the pressure of liquid supplied through both the ports 44A and 45A can be higher than the supply pressure due to effort exerted upon liquid trapped between the spool 51 and the master cylinder piston 13A.

Each of the devices described above with reference to the accompanying drawings would be suitable for use as the master cylinder device of a fluid pressure control system for operating a friction clutch, if the first port 44, 44A, 44B was blocked. It will be understood that the master cylinder outlet port 19, 19A, 19B would be connected to the clutch operating slave cylinder.

We claim:

1. A master cylinder device comprising a body, a bore in the body, a freely floating master cylinder piston in the bore, and control valve means arranged to apply fluid under pressure from a remote fluid pressure supply source to the master cylinder piston to move the master cylinder piston within the bore, wherein the control valve means include a valve spool slidable in the bore, first second and third ports in the wall of the bore, and a space in the bore between the valve spool and the piston, the valve spool being arranged to place the first port in communication with a selected one of the second and third ports dependent upon the position of the valve spool within the bore, the first port also being in communication with said space, said valve spool being tubular with a through bore, with a rod in said through bore, first resilient means urging the tubular valve spool away from the master cylinder piston and second resilient means arranged so that brake applying movement is imparted to the rod and is imparted to said valve spool via said second resilient means and, if fluid pressure is not available in said space to move said master cylinder piston, said rod imparts brake applying movement to the piston.

2. A master cylinder device according to claim 1, wherein the valve spool is arranged so as to place said first port in communication with said third port via said space.

3. A master cylinder device according to claim 1, wherein said first port communicates with said space via a non-return valve which prevents flow of fluid from said space towards said first port.

4. A master cylinder device according to claim 1, wherein said first port and said space are placed in communication with the selected one of said second and third ports via passage means in said valve spool.

5. A master cylinder device according to claim 1, wherein the second resilient means comprises a pad of elastomeric material.

6. The master cylinder device of 1 including a slave cylinder device and conduit means connecting the master cylinder device to the slave cylinder device so that liquid displaced from the master cylinder by movement therein of a master cylinder piston is transmitted to the slave cylinder causing movement of a slave cylinder piston in the slave cylinder, said second port being connected to a liquid reservoir and said third port being connected to a source of liquid pressure.

7. The master cylinder device of claim 6, wherein the slave cylinder is one brake operating motor cylinder and said first port is in conduit communication with another brake operating motor cylinder.

8. The master cylinder device of claim 6 for operating a friction clutch, wherein the first port of the motor cylinder device to the conduit means is closed.

* * * * *